Sept. 21, 1965  J. E. WALDRUM  3,207,379
DRY SPREADER
Filed May 15, 1963  6 Sheets-Sheet 1

INVENTOR.
JOHN E. WALDRUM
BY

ATTORNEYS.

Sept. 21, 1965   J. E. WALDRUM   3,207,379
DRY SPREADER

Filed May 15, 1963   6 Sheets-Sheet 2

INVENTOR.
JOHN E. WALDRUM
BY
Caesar and Rivise
ATTORNEYS.

INVENTOR.
JOHN E. WALDRUM
BY
Caesar and Rivise
ATTORNEYS.

Sept. 21, 1965     J. E. WALDRUM     3,207,379

DRY SPREADER

Filed May 15, 1963     6 Sheets-Sheet 4

INVENTOR.
JOHN E. WALDRUM
BY
Caesar and Rivise
ATTORNEYS.

Sept. 21, 1965 J. E. WALDRUM 3,207,379
DRY SPREADER

Filed May 15, 1963 6 Sheets-Sheet 5

INVENTOR.
JOHN E. WALDRUM
BY
Caesar and Rivise
ATTORNEYS.

United States Patent Office 3,207,379
Patented Sept. 21, 1965

3,207,379
DRY SPREADER
John E. Waldrum, Ambler, Pa., assignor to Amchem Products, Inc., Ambler, Pa., a corporation of Delaware
Filed May 15, 1963, Ser. No. 280,665
6 Claims. (Cl. 222—177)

Dry spreaders currently in use must be frequently cleaned and oiled. Moreover, the quantity of solids to be applied to a given unit area will vary depending upon the nature of the solids being applied. For example, twice as much of a particular fertilizer may be needed as compared with a desired herbicide, seeds may require a still different unit distribution and another herbicide will undoubtedly have to be applied on a different unit basis.

Hence, the spreaders curerntly in use have a variable discharge opening which must be calibrated and constantly cleaned and oiled to assure accurate adjustment of the discharge opening.

It is accordingly an object of the present invention to provide a dry spreader of low cost.

A further object of the present invention is to provide a dry spreader which also functions as the shipping container for the material held therein.

A still further object of the present invention is to provide a dry spreader specially suited for the particular material to be distributed therefrom.

Yet another object of other forms of the present invention is to provide a permanent, reusable dry spreader in several different forms for either special adaptations or with the incorporation of unique design features.

A still further object of the present invention is to provide both a permanent, reusable dry spreader and a dry spreader which also functions as the shipping container for the material held therein, both of which forms of the dry spreader include a resilient closure flap which is adapted to be intermittently urged from its normal position, through movement of the dry spreader, to permit a controlled discharge of material contained in the spreader. Further, the closure flap is permitted to snap intermittently to its normal position thereby agitating certain of the material contained in the spreader.

The foregoing as well as other objects of the invention are achieved by providing in one embodiment of the invention a dry spreader which comprises a container for shipping and storing the material to be distributed. The container includes a face which has at least one discharge opening therein.

A closure flap covers the discharge opening to prevent discharge of the contained material.

A rotatable axle is secured adjacent the discharge opening and at least one ground engaging wheel is secured to the axle to impart rotational movement to the axle. Also secured to and projecting from the axle for rotation therewith is at least one dowel. The dowel is so positioned with respect to the closure flap that when the dowel is rotated it will intermittently urge the closure flap away from the discharge opening. In this manner a controlled discharge of material is effected.

It is to be further seen that the closure flap is preferably resiliently biased against the container so that it will immediately snap back against the container as soon as it is no longer contacted by the dowel. Such snapping action also tends to agitate the remaining material held in the container.

In a first alternate form of this embodiment of the invention, the ground engaging wheels may be dispensed with to provide a portable dry spreader, and with a crank provided to impart rotational movement to the axle.

In a second alternate form of this embodiment of the invention and inexpensive permanent frame is provided for the shipping container which is held in place by the resilient bands which also impart resiliency to the closure flap. A separable flange may be inserted against the resilient closure flap in order to insure contact between the closure flap and the dowels.

In a third alternate form of this embodiment of the invention the dowels secured to the axle are replaced by spaced inwardly projecting lugs secured to the inner surface of at least one of the ground engaging wheels, the lugs being adapted to be urged against a projection extending from the resilient closure flap in order to urge the same intermittently away from its normal position.

In a fourth alternate form of this embodiment of the invention, the basic container is modified to provide a recessed area which receives a portion of the rotatable axle assembly so that the closure flap will not protrude below the bottom of the container.

In another embodiment of the invention a permanent, reusable dry spreader is provided that includes a resilient closure flap which is adapted to be intermittently urged from its normal position through movement of a cam actuated by rotation of a wheel of the spreader. Urging of the closure flap away from its normally closed position permits a controlled discharge of material contained in the spreader. When the cam no longer contacts the closure flap, it immediately snaps to its closed position thereby agitating certain of the material contained in the spreader.

In still another embodiment of the invention, an inexpensive permanent carrier is provided with the foregoing closure flap arrangement and includes an integral internal protruding chamber which houses the axle assembly.

Other objects and many of the attendant advantages of this invention will be readily appreciated as the same becomes better understood by reference to the following detailed description when considered in connection with the accompanying drawings wherein.

Figures 1, 2, 5:
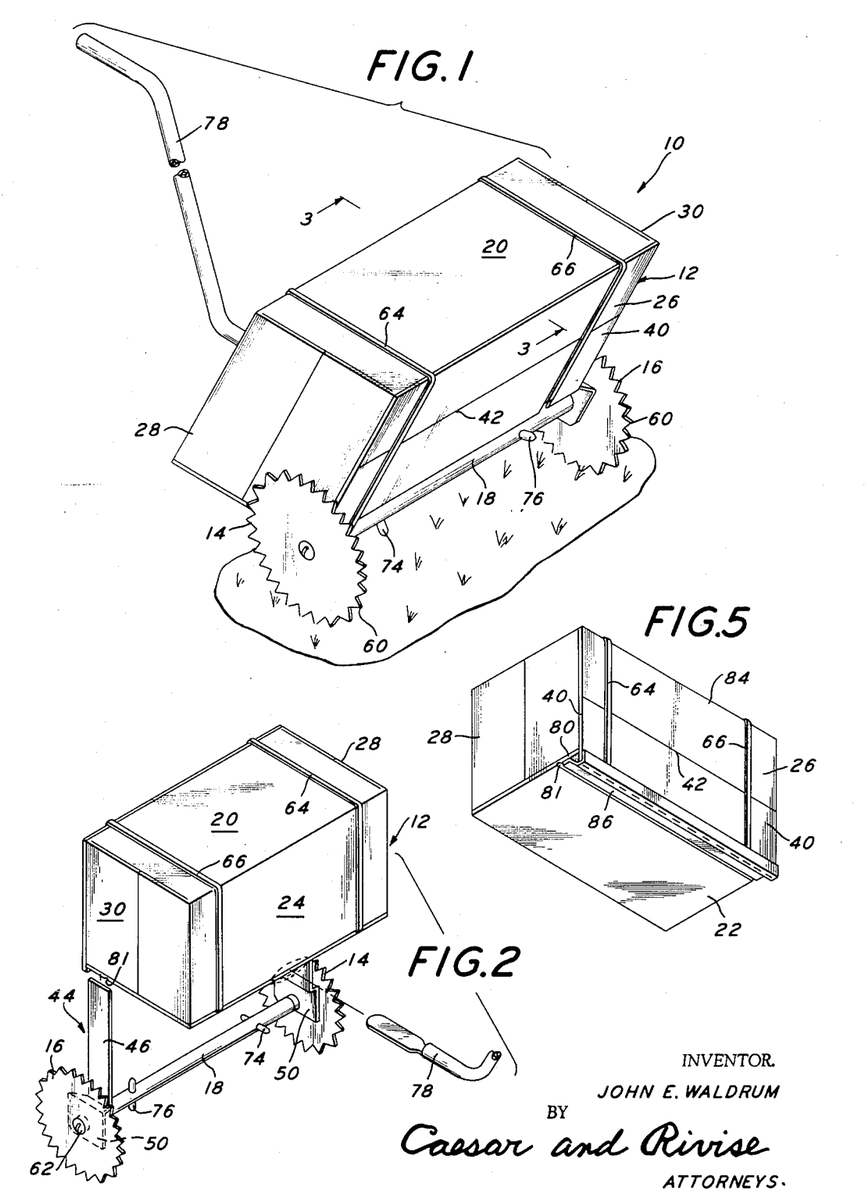
FIG. 1 is a perspective view of a first embodiment of the present invention taken generally from the front thereof.
FIG. 2 is an exploded perspective view on a reduced scale of the invention of FIG. 1 taken generally from the rear thereof.
FIG. 5 is a perspective view of a container taken generally from the front thereof, constructed in accordance with the present invention and adapted to be easily converted to the spreader of FIG. 1.

Referring now in greater detail to the various figures of the drawings wherein similar reference characters refer to similar parts, a distributor of material constituting a first embodiment of the present invention is generally shown at 10 in FIG. 1 and includes a container 12, ground engaging wheels 14 and 16 secured to axle 18 which is in turn secured to the container 12.

Figures 3, 4:
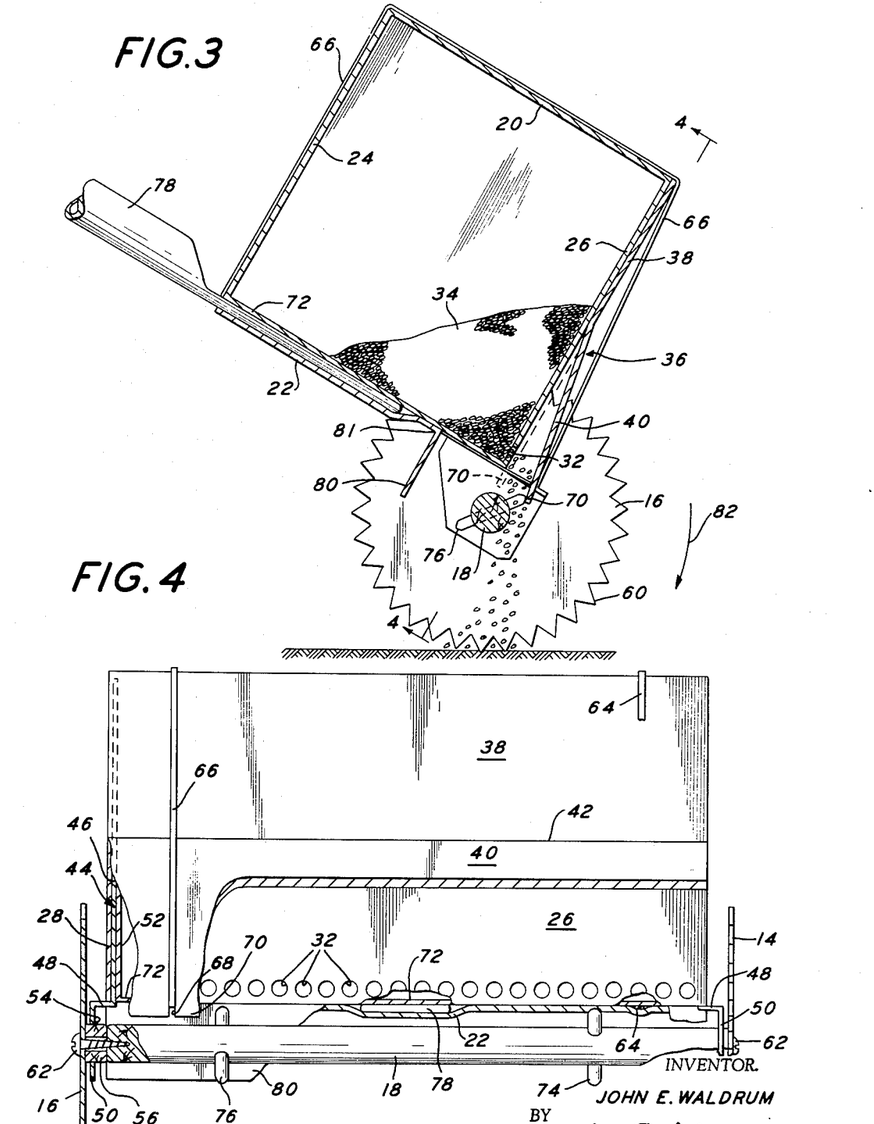
FIG. 3 is an enlarged sectional view partly in phantom taken along the lines 3—3 of FIG. 1.
FIG. 4 is a sectional view partly broken away for the sake of clarity, taken along the lines 4—4 of FIG. 3.

Container 12 may be of corrugated cardboard, metal, plastic or any other suitable material. Container 12 basically comprises, as shown in FIGS. 1 and 3, top panel 20, bottom panel 22, rear panel 24, front panel 26 and side panels 28 and 30. As shown in FIGS. 3 and 4, front panel 26 has formed therein adjacent its lower edge, a plurality of discharge openings 32 through which material 34 may flow via gravity from container 12.

Secured against the outer surface of front panel 26 is closure flap 36 which basically comprises an upper support portion 38 and a lower portion or gate 40 foldably or hingedly secured thereto along line 42. Gate 40 is normally held flush against panel 26 as illustrated in phantom in FIG. 3 by resilient means or rubber bands 44 for purposes to be discussed in greater detail. It is seen, however, that when gate 40 is positioned against panel 26, discharge openings 32 are covered by gate 40 and thus the material 34 will not flow from container 12.

Axle 18 is secured to container 12 in a manner as illustrated in FIG. 2 by means of brackets 44. Each of brackets 44 include an upper securement tab 46, an intermediate ledge 48 at right angles to tab 46 and a flange 50 at right angles to ledge 48 and offset from tab 46. Securement tab 46 is inserted between inner end flap 52 of container 12 and outer end panel 28 and is frictionally held in place. If desired, adhesive tape or other holding means may be employed. Alternatively, another piece of corrugated cardboard (not shown) may be applied over tab 46 and against end panel 26 to secure tab 46 to container 12.

The left hand flange 50 (as viewed in FIG. 4) includes an opening 54 through which a relatively thick spacer washer 56 is inserted. Washer 56 possesses a central bore 58. Wheel 16 with serrations 60 possesses a central hole whereby a wood screw 62 may secure wheel 16 to axle 18 which is of wood or other material to accept wood screw 62.

It is to be noted that wheel 16 will thereby rotate independently of axle 18. This is because the wheel 16 may rotate with respect to wood screw 62 inasmuch as the wheel 16 is merely sandwiched between the head of screw 62 and washer 56. It is seen, however, that wood screw 62 may be so tightened that the wheel 16 would not rotate with respect to wash 56. However, it is desirable that one wheel of the present invention rotate independently of axle 18 to facilitate turning of the spreader of the present invention. During turning wherein wheel 14 is the inside or pivot wheel, the wheel 14 rotates very little, if at all, and thus there is very little rotation of axle 18.

However, wheel 16 may rotate independently of axle 18 and thus a full 180° turn may be made.

Likewise, a full turn may be made when wheel 16 is the inside pivot wheel.

The right hand bracket 44 including flange 50 is of a construction similar to the left hand bracket 44. However, a washer 56 is not employed with right hand bracket 44 inasmuch as at least one wheel is needed to drive axle 18 for reasons to be discussed. Thus, any rotation of wheel 14 causes a corresponding rotation of axle 18.

As shown in FIG. 3, the gate 40 is normally held flush against panel 26 by means of rubber bands 64 and 66 (FIG. 1) which completely circumscribe the girth of container 12. Slits 68 are provided in the lower edge 70 of gate 40 (FIG. 4). The rubber bands pass between specially applied bottom panel 22 and the bottom inner panel 72 of container 12. Otherwise the rubber bands lie externally of container 12. Alternatively, the rubber bands may be replaced with spring arrangements or other means for resiliently biasing the gate 40 against panel 26. Moreover, the closure flap 36 may be of a resilient metal, plastic or other resilient material whereby the gate 40 will be inherently biased against panel 26.

It is to be further noted, as shown in FIGS. 3 and 4, that lower edge 70 of gate 40 projects slightly below the bottom inner panel 72. This is to enable the edge 70 to be urged away from the container by means of dowels 74 and 76 secured to axle 18. As seen in FIG. 4 each dowel 74 and 76 projects at each end away from axle 18 and thus, each of the dowels will contact edge 70 twice during one revolution of the axle. As further illustrated in FIG. 4, the dowels are out of phase with each other by about 90°. Thus, a rigid edge 70 of a rigid gate 40 will be urged away from container 12 four times for each revolution of the axle.

It is to be noted that the tips of the dowels are somewhat tapered so that they may easily pass beyond and away from the flap 70 as viewed in FIG. 3 wherein the gate 40 is shown in phantom in its normal position flush against the container 12 and in full line in being urged away by dowel 76.

It follows that material 34 is discharged through openings 32 each time a dowel functioning as an actuating means urges flap 70 away from its normal flush position. Such urging is constant and reliable and thus the fixing of the size of openings 32 at the place of manufacture insures a precise discharge of material 34. Moreover, when a dowel has passed beyond flap 70, it immediately snaps back against container 12 thereby agitating any of material 34 adajacent openings 32. It is to be additionally appreciated that even after gate 40 has snapped against container 12, any material 34 held between the dowel and the axle 18 will fall to the ground upon further rotation of axle 18.

As this is occurring, another dowel is about to contact flap 70 at another point along its length, inasmuch as has been previously explained, a dowel tip contacts the flap 70 each quarter revolution (90°) of axle 18 where there are two dowels extending through axle 18 and are 90° out of phase with each other.

Thus, material 34 is substantially being discharged at all times although the flap 70 is intermittently drawn away from container 12. In this manner, a portion of the material 34 in container 12 may be distributed and the remaining material in the container 12 may be stored for later use as the gate 40 is held flush thereagainst by rotating the axle by less than a quarter turn.

Of course, the number, size and spacing of the dowels and openings 32 may be varied by the manufacturer as dictated by the optimum desired distribution of material 34.

Moreover, a handle 78 may be provided and is secured to container 12 by having its flattened end positioned between bottom panel 22 and panel 72 in a manner similar to rubber bands 64 and 66. If desired, bottom panel 22 may be separately applied to container 12. As shown in FIG. 3, bottom panel 22 includes a folded forward flap 80 (see fold line 81) which retards backward drift of material 34 when the spreader wheels are rotated forwardly or in the direction of clockwise arrow 82 of FIG. 3.

The present unit may be easily constructed from the container 84 of FIG. 5 which initially serves as the shipping container for material 34. As shown in FIG. 4, gate 40 is held flush against container 84 and flap 80 is folded upwardly against bottom panel 22 to abut against and at right angles to gate 40. Tape 86 is then applied over the abutting edges of gate 40 and flap 80 to seal the package 84.

In use, tape 86 is removed and flap 80 is folded at right angles to its position of FIG. 3. Brackets 44 are interposed under the side panels 28 and 30 as shown in FIGS. 2 and 4 with axle 18 and wheels 14 and 16 (with washer 56) assembled with the use of screws 62. Handle 70 is inserted in place and the spreader is ready for use.

Figure 6:
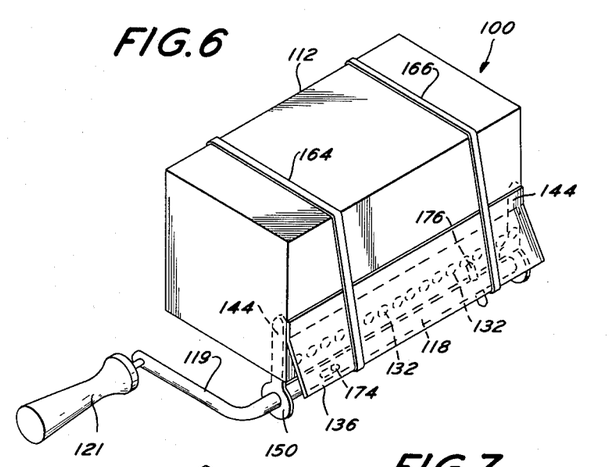
FIG. 6 is a perspective view of a first alternate form of the first embodiment of this invention.

Attention is now referred to FIG. 6 which shows a first alternate form of the embodiment of FIGS. 1 to 5. In FIG. 6 as well as the remaining figures in this case, an effort has been made to follow as closely as possible the numbering sequence used in FIGS. 1 to 5 with the addition of a numeral in the hundred column in order to distinguish the various forms and embodiments of the invention.

Returning to the first alternate form of FIG. 6, there is shown a distributor 100 which includes a container 112 and an axle 118 which terminates in a crank arm 119 having a grasping handle 121 projecting therefrom.

In this embodiment of the invention the unit of FIGS. 1 to 5 is rendered portable with ground engaging wheels 14 and 16 being eliminated. Instead, motion is imparted to axle 118 by hand cranking of the axle 118 through the handle 121 and the arm 119.

Otherwise, the spreader 100 is essentially identical to the spreader 10 of FIGS. 1 to 5. Hence, it includes discharge openings 132 which are normally covered by closure flap 136. Brackets 144 including flanges 150 are provided for rotative securement of the axle 118. Furthermore, rubber bands 164 and 166 resiliently bias the closure flap 136 in a manner essentially similar to the rubber bands 64 and 66 of FIGS. 1 to 5. Finally, dowels 174 and 176 project from the axle 118 in order that the material held in container 112 may be discharged through openings 132 each time a dowel functioning as an actuating means urges closure flap 136 away from its normally flush position in a manner similar to the action of the device of FIGS. 1 to 5.

Figures 7, 8:
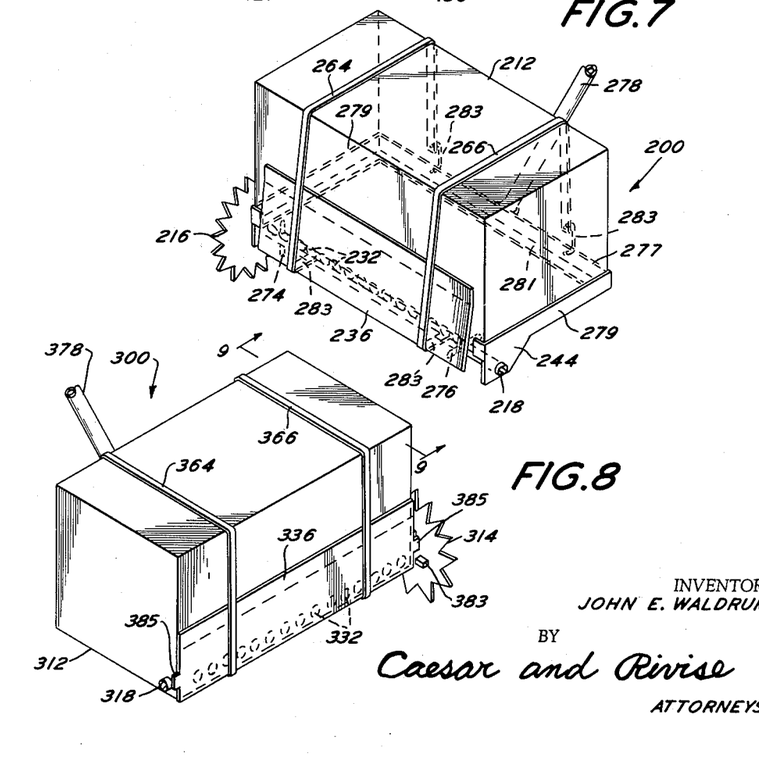
FIG. 7 is a perspective view of a second alternate form of the first embodiment of this invention.
FIG. 8 is a perspective view of a third alternate form of the first embodiment of this invention.

Attention is now referred to FIG. 7 which shows a second alternate form of the embodiment of FIGS. 1 to 5. In FIG. 7 there is shown a distributor 200 that essentially comprises an inexpensive metallic frame 275 which is basically U-shaped and made of angle material including an upstanding vertical flange and a horizontal support flange. Frame 275 basically comprises a rear member 277 and side members 279, each possessing a horizontal flange 281 that serves as a ledge to support container 212. Extending backwardly from the frame 275 is a handle 278.

As further shown in FIG. 7, the side members 279 extend forwardly and terminate in brackets 244 which receive axle 218 to which ground engaging wheels 214 (not shown) and 216 are secured. Moreover, dowels 274 and 276 extend from the axle 218.

In use a container 212, that may also be the shipping container, is provided which includes a closure flap 236 that is hingedly secured to the container 212. The closure flap 236 covers openings 232 when in its normally closed position.

After the container 212 has been positioned upon the 275 and the closure flap 236 is rendered hingeable, rubber bands 264 and 266 are secured about the container 212. As shown in FIG. 7, the rubber bands 264 and 266 may be in the form of lengths of resilient material having two free ends, each of which are secured to hook means 283 which are in turn secured either to axle 218 or rear member 277.

It follows that material is discharged through openings 232 each time a dowel functioning as an actuating means urges the closure 236 away from its normal flush position. Moreover, once the dowel has passed beyond the flap 236, it is caused immediately to snap back against the container 212 and thereby agitate the material adjacent the openings 232. Where desired a separate flange (not shown) may be inserted over the closure flap 236 in order to assure contact between the closure flap 236 and the dowels 274 and 276 as the wheels 214 and 216 rotate.

Figure 9:
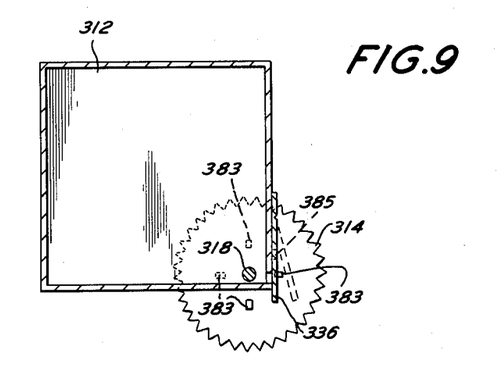
FIG. 9 is a sectional view taken along the lines 9—9 of FIG. 8.

Attention is now referred to FIGS. 8 and 9 which show a third alternate form of the embodiment of FIGS. 1 to 5. This form 300 of the invention is quite similar to the form of FIGS. 1 to 5 and basically includes a container 312 with ground engaging wheels 314 and 316 (not shown) secured at each end of an axle 318. Discharge openings 332 are provided in the container 312 and are covered by hinged closure flap 336 when in the normally closed position. The ground engaging wheels are secured to brackets (not shown) which include a flange to support the axle 318. Rubber bands 364 and 366 are provided to resiliently bias the closure flap 336, and a handle 378 is provided.

It is to be noted that the form of the invention of FIGS. 8 and 9 differs from that shown in FIGS. 1 to 5 in that dowels projecting from the axle are eliminated and instead replaced by spaced inwardly projecting lugs 383 which are secured to the inner surface of the ground engaging wheels as shown in either FIG. 8 or FIG. 9. Extensions 385 which may be integral with the closure flap 336 project outwardly therefrom in order to be intermittently engaged by one of the rotating lugs 383. This action is illustrated in FIG. 9 wherein a lug 383 has urged the closure flap 336 outwardly to an open position as shown in phantom by virtue of the engagement of a lug 383 with an extension 385. When the lug has passed beyond the extension 385, the closure flap 336 immediately snaps back against the container 312 thereby agitating any material adjacent the openings 332.

Figures 10, 18:
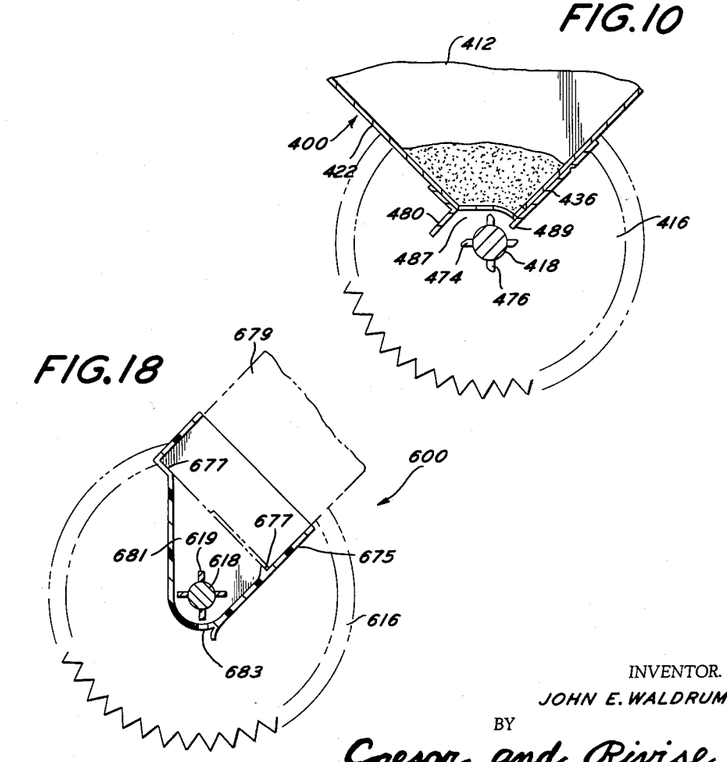
FIG. 10 is a perspective view of a fourth alternate form of the first embodiment of this invention.
FIG. 18 is a perspective view of another embodiment of the invention.

Attention is now referred to FIG. 10 which shows a fourth alternate form of the embodiment of FIGS. 1 to 5. In FIG. 10 there is shown a portion of a distributor 400 which is similar to the distributor 10 of FIG. 3. Thus, in FIG. 10 the distributor 400 includes a container 412 with ground engaging wheels 414 (not shown) and 416 secured to axle 418, with the container 412 having discharge openings formed therein similar to openings 32 of FIG. 3 and including hinged closure flap 436 and drift flap 480. Dowels 474 and 476 project from the axle 418.

A comparison of FIGS. 3 and 10 will show that the device of FIG. 10 includes a recessed area 487 which partially receives the axle 418 and the dowels projecting therefrom. By virtue of the construction of FIG. 10, the axle 418 may be located closer to the bottom panel 422 than the axle 18 is located with respect to the bottom 22 of FIG. 3. In this manner the closure flap 436 does not protrude below the bottom panel 422 but rather terminates along edge 489 which is slightly spaced above the bottom panel 422. As further seen in FIG. 10, the dowels 474 and 476 will alternately engage a portion of closure flap 436 adjacent edge 489 in order to alternately open and close the same.

Attention is now referred to FIGS. 11 to 17 which show another embodiment of the present invention which is a permanent reusable dry spreader. This embodiment 500 of the invention basically comprises a V-shaped container 512 supported by ground engaging wheels 514 and 516 which are secured to an axle 518 (FIG. 15) which is in turn secured to container 512.

Figures 11, 12, 13, 14:
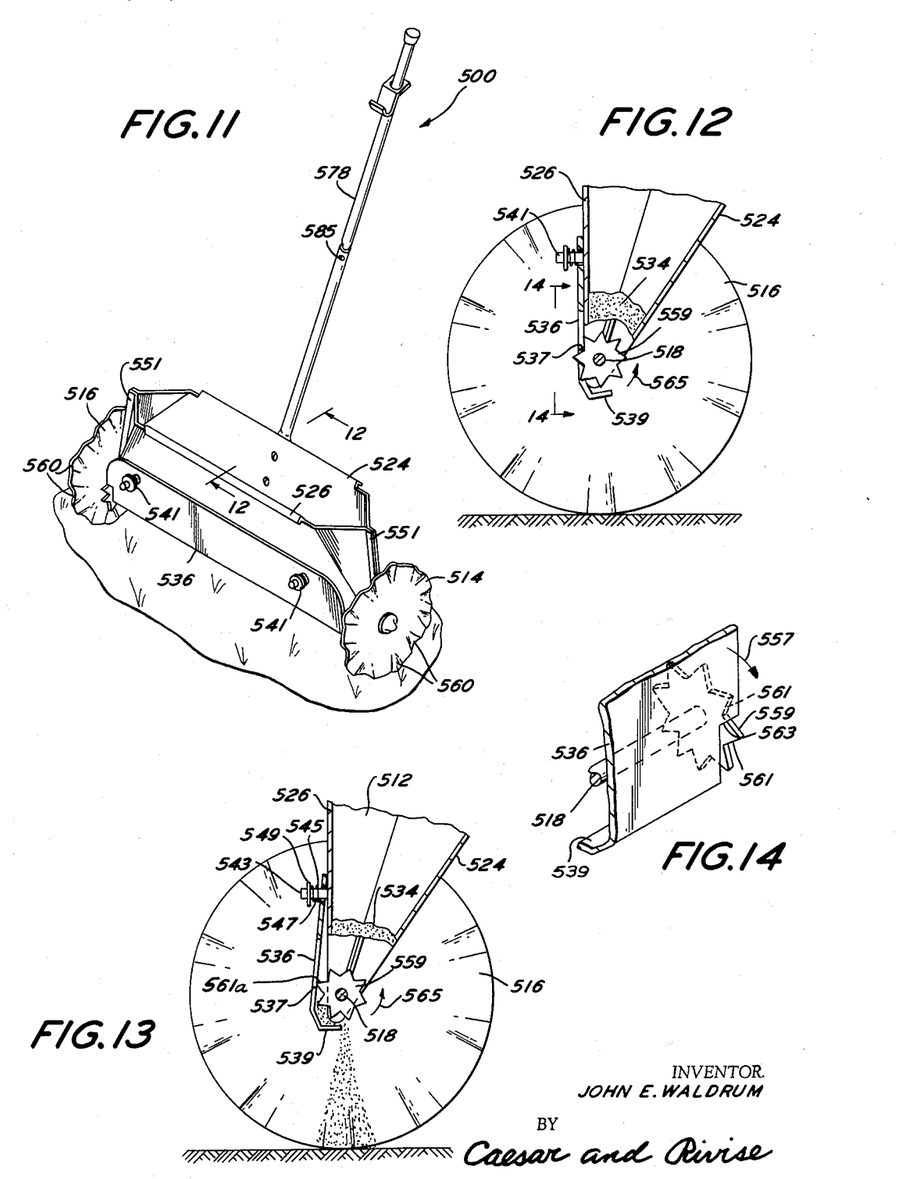
FIG. 11 is a perspective view of another embodiment of this invention.
FIG. 12 is an enlarged sectional view taken along the lines 12—12 of FIG. 11.
FIG. 13 is a view similar to FIG. 12, but showing the closure flap in open position under the urging of the cam.
FIG. 14 is an enlarged view of a detail showing the relationship between a corner area of the closure flap and the cam.
Figures 15, 16, 17:
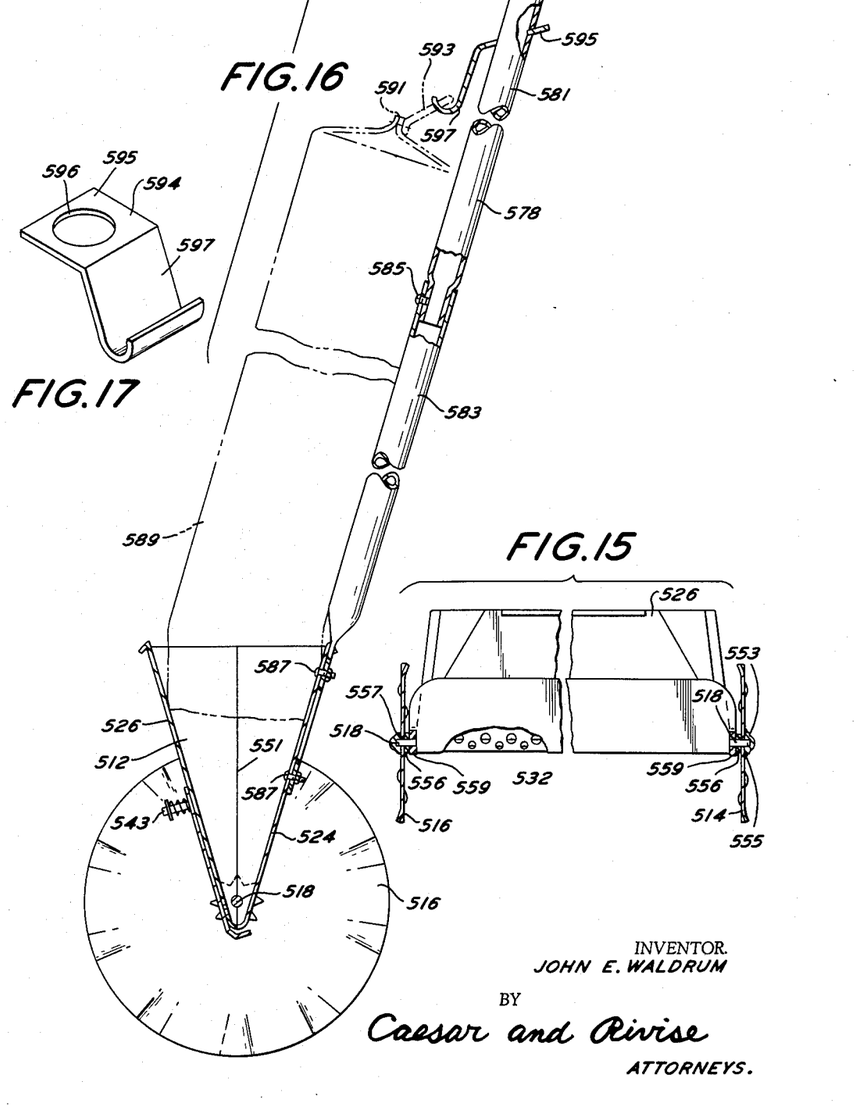
FIG. 15 is a front elevational view of the device of FIG. 11 with the handle removed, and certain portions of the device broken away or shown in section for the sake of clarity.
FIG. 16 is an enlarged side elevational view of the device of FIG. 11 with certain portions broken away or shown in section for the sake of clarity, and with a bag containing spreadable material shown in phantom.
FIG. 17 is an enlarged perspective view of a bag holding clamp.

As best shown in FIG. 16, the container 512 is basically V-shaped and is comprised of rear panel 524 and front panel 526 which intersect and merge together at the lower edges thereof and are further secured together along vertical edges as shown in FIG. 11. The upper edges of the panels 524 and 526 are bent over in order to minimize any sharp edges which would cut into a bag of material as it was being loaded upon the spreader 500. Of course, other designs and shapes of the container 512 will be apparent to those skilled in the art, and therefore it is the association of the other elements of this invention which defines the essence of patentability which is disclosed and claimed herein. As shown in FIG. 15, the front panel 526 has formed therein adjacent its lower edge a plurality of discharge openings 532 through which material 534 may flow via gravity from container 512.

As illustrated in FIGS. 11, 12, 13 and 16, there is secured against the outer surface of front panel 526, a closure flap 536 which consists of a vertical section 537 which merges into a horizontal short section 539, with the configuration of the closure flap 536 being such that it essentially nests against the lower portion of front panel 526 and the intersection of the panels 524 and 526 as viewed in FIG. 12.

The closure flap 536 is normally held in the closed position of FIG. 12 by virtue of spring tension means 541 which as best shown in FIGS. 13 and 16 includes a stem 543 secured to front panel 526 and projecting frontwardly thereof. The stem 543 passes through a complementary opening 545 in the closure flap 536 and then projects frontwardly thereof. A short coil spring is positioned upon the stem 543 so that the closure flap 536 is interposed between the coil spring 547 and the front panel 526. Finally, a tightening nut 549 is applied against the front end of the coil spring 547, and is held on the stem 543 by engagement with threads (not shown) provided for such purpose.

It is thus seen that the closure flap 536 is resiliently biased against the front panel 526 in the normally closed position of container 512. In such position the discharge openings 532 are covered by the closure flap 536 and thus the material 534 will not flow from the container 512.

As noted in FIG. 16, the axle 518 passes through complementary openings formed in the vertical merger 551 of front and rear panels 524 and 526. Where necessary suitable bearings may be provided. As further illustrated in FIG. 15, the axle 518 projects outwardly beyond container 512 along both sides thereof.

A spacer washer 556 is then applied to the axle 518, and is interposed between each side of the container 512 and each of the ground engaging wheels 514 and 516. As shown in the various figures, the ground engaging wheels 514 and 516 possess indentations or corrugations 560 in order to enhance contact with the ground.

As further shown in FIG. 15, a cap 553 receives one end of the axle 518 and is welded at 555 to the exterior face of wheel 514. Another cap 557 is secured to the other end of axle 518 by frictional engagement but is not welded to the wheel 516.

It is therefore to be noted that the wheel 516 will thereby rotate independently of axle 518. This is because the wheel 516 may rotate with respect to the axle 518 inasmuch as the wheel 516 is merely sandwiched between the cap 557 and the washer 556.

However, by virtue of the weld 555, the other end of the axle 518, the wheel 514 and the cap 553 are all secured together and thus will rotate as a unit. This is done so that one wheel of the present invention will rotate independently of the axle 518 to facilitate turning of the unit. Also, it will be insured that the axle will always be driven. It is to be noted that during turning wherein the wheel 514 is the inside or pivot wheel, the wheel 514 rotates very little, if at all, and thus there is very little rotation of the axle 518. However, wheel 516 may rotate independently of axle 518 and thus a full 180° turn may be made. Likewise a full turn may be made when wheel 516 is the inside pivot wheel.

As shown in FIGS. 12, 13 and 14, a cam 559 with eight pointed cam lobes 561 is secured upon each end of axle 518 for rotation therewith in a position interiorly of the washers 556. Moreover, the closure 536 has its lower corners cut away in cut away areas 563 to provide a clearance for the cam lobes 561 once they have urged the closure flap 536 outwardly against the force of spring tension means 541. This action is illustrated by comparing FIGS. 12 and 13.

As the spreader 500 is pushed along the ground by a force applied to handle 578, the ground engaging wheels 514 and 516 are accordingly rotated. This in turn causes the shaft 518 to be rotated in a given sense, such as in a counterclockwise sense, as illustrated by the arrows 565 in FIGS. 12 and 13. Inasmuch as the cams 599 are secured for rotation with the shaft 518, the cams 599 with their cam lobes 561 are also caused to rotate in a counterclockwise direction as viewed in FIGS. 12 and 13, or as viewed in the direction of arrow 567 of FIG. 14. As a given cam lobe is rotated as viewed in FIG. 14, it is moved to a position where it can strike the rear face of closure flap 536 as illustrated in FIG. 13. As the striking cam lobe 561–a rotates a bit further it urges the closure flap 536 outwardly to the position of FIG. 13. In other words it forces the closure flap 536 to move against the force of spring tension means 541 in such a manner that the closure flap 536 is essentially pivoted about its upper horizontal edge. When the closure flap 536 is forced by the cam 559 to its open position, material 534 may flow from the container 512 and thus be discharged to the ground. As soon as the cam lobe 561–a has moved so that it can enter the cut away area 563 of FIG. 14, the cam lobe 561 no longer contacts the closure flap 536 and thus the closure flap 536 may return under the force of the spring tension means 541 to the normally closed position of FIG. 12.

Where desired, the cams 559 may be mounted upon each end of the shaft 518 in such a manner that the cam lobes 559 are out of phase with each other by about 90° in a manner similar to that illustrated in FIG. 4 in connection with the dowels thereshown. Thus, material will be discharged through openings 532 on one side of the spreader and then alternatively on the other side of the spreader.

It therefore follows that the material 534 will be discharged each time a cam lobe 561 strikes the closure flap 536. This striking action is constant and reliable and insures a precise discharge of the material 534. Moreover, when a cam lobe has moved into the cut away area 563, the closure flap 536 immediately snaps back against the container 512 thereby agitating any material 534 adjacent openings 532. As this is occurring a cam lobe of the opposite cam is about to contact the closure flap 536 at the other side of the spreader inasmuch as the two cams are out of phase with each other by about a quarter of a revolution.

Thus, the material 534 is substantially being discharged at all times although the closure flap 536 is intermittently drawn away from and returned to the container 512. It is, of course, to be appreciated that either one cam may be employed in the center of the device or more than two cams may be employed depending upon the type of discharge which is desired.

As noted in FIGS. 11 and 16, a handle 578 is provided and essentially consists of sections 518 and 583 which telescope together and are secured by means of bolt 585. The lower portion of the handle 578 is flattened and is secured to rear panel 524 of container 518 by means of bolts 587.

In use a bag 589 or other container for the material 534 is opened, inverted without spilling the contents thereof and inserted upon the container 512 in the inverted position in a manner shown in FIG. 16. As noted in FIG. 16, the bottom seam 591 of the bag 589 includes a loop 593 which is adapted to be engaged by bag holding clamp 594. As shown in FIG. 17, the bag holding clamp 594 includes a base 595 with an opening 596. The base 595 merges into a latch 597. The bag holding clamp 594 is slipped upon the handle 578 prior to the application of closure flap 598 thereto. The base 595 is received upon the handle 578 by virtue of the passage of handle 578 through the opening 596. The base 595 is thereafter brought to an inclined position as illustrated in FIG. 16. In this position the latch 597 will engage the loop 593 and thus secure the upper portion of the bag 589 in the inverted position of FIG. 16.

Attention is now referred to FIG. 18 wnich shows at 600 another embodiment of the invention. This embodiment essentially includes a frame 675 with ledges 677 to support a box 679 of material. A protruding chamber 681 is provided which is integral with the frame 675. An axle 618 is essentially located in the chamber 681, and includes agitating paddles 619 in order to prevent any material contained in the chamber 681 from becoming agglomerated. Where desired wiper blades may be secured to the paddles 619 in order to insure that the discharge opening 683 from the chamber 681 remain opened. Should it be desired that discharge openings 683 be alternatively opened and closed, the paddles 619 may be supplemented by dowels which will alternatively strike or otherwise contact a resiliently biased closure flap. Ground engaging wheels are secured to the axle 618 as illustrated by the wheel 616 in FIG. 18.

It is thus seen that the present invention provides both a permanent, usable dry spreader and a dry spreader which also functions as the shipping container for the material held therein, both of which forms of the invention include a resilient closure flap that is adapted to be intermittently urged from its normal position, through movement of the dry spreader to permit a controlled discharge of material contained in the spreader. Further, the closure flap is permitted to snap intermittently to its normal position thereby agitating certain of the material contained in the spreader.

Obviously many modifications and variations of the present invention are possible in the light of the above teachings. It is, therefore, to be understood that within the scope of the appended claims, the invention may be practiced otherwise than as specifically described.

What is claimed as the invention is:

1. A distributor for material comprising a container for storing said material, said container including a face having at least one discharge opening therein, a closure flap resiliently biased by spring tension means and covering said opening to prevent discharge of said material, a rotatable axle secured adjacent said face, at least one cam means secured for rotation with said axle adjacent said closure flap and adapted to be urged under movement of said container to intermittently force said closure flap away from said opening thereby permitting controlled discharge of said material from said container, whereby said closure flap will snap back against said face after said cam means has urged said closure flap away from said opening.

2. The invention of claim 1 including at least one ground engaging wheel secured to said axle to impart rotation thereto.

3. The invention of claim 1 wherein said closure flap includes a cut away area to provide clearance for said cam means after it has urged said flap from its normally closed position.

4. The invention of claim 1 including a handle secured to said container, a bag holding clamp mounted on said handle, said clamp including a latch adapted to engage and secure a bag partially positioned in and extending outwardly from said container.

5. The invention of claim 1 wherein said container is positioned upon a frame having a protruding chamber with discharge openings and said axle extending through said chamber.

6. The invention of claim 1 including two ground engaging wheels mounted on said axle with one of said wheels being fixedly secured to said axle to provide a positive drive and the other wheel being slippable with respect to said axle.

References Cited by the Examiner

UNITED STATES PATENTS

| | | | |
|---|---|---|---|
| 2,394,778 | 2/46 | Holloway | 222—177 |
| 2,609,124 | 9/52 | Bergstrom | 222—177 |
| 2,639,571 | 5/53 | Kelly | 222—177 X |
| 3,080,098 | 3/63 | Fierman | 222—177 X |
| 3,107,822 | 10/63 | Regenstein | 222—177 |

LOUIS J. DEMBO, *Primary Examiner.*